(12) United States Patent
Chung et al.

(10) Patent No.: US 7,622,528 B2
(45) Date of Patent: *Nov. 24, 2009

(54) PROCESS FOR PREPARING THERMOPLASTIC ELASTOMERS BY DYNAMIC VULCANIZATION

(75) Inventors: Oansuk Chung, Copley, OH (US); Peter W. Manders, Hudson, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/167,480

(22) Filed: Jun. 27, 2005

(65) Prior Publication Data

US 2006/0293458 A1 Dec. 28, 2006

(51) Int. Cl.
C08L 23/04 (2006.01)
C08L 23/10 (2006.01)
C08L 23/16 (2006.01)
(52) U.S. Cl. ..................... 525/191; 525/240
(58) Field of Classification Search ............... 525/240, 525/191
See application file for complete search history.

(56) References Cited

U.S. PATENT DOCUMENTS

| 4,130,535 | A | | 12/1978 | Coran et al. |
| 4,143,099 | A | | 3/1979 | Duncan |
| 4,594,390 | A | | 6/1986 | Abdou-Sabet et al. |
| 5,847,052 | A | | 12/1998 | Hamanaka |
| 5,861,463 | A | * | 1/1999 | Sehanobish et al. ......... 525/240 |
| 6,147,160 | A | | 11/2000 | Wang et al. |
| 6,245,856 | B1 | * | 6/2001 | Kaufman et al. ............ 525/240 |
| 6,610,786 | B1 | | 8/2003 | Itoh |
| 6,630,538 | B1 | * | 10/2003 | Ellul et al. .................. 525/194 |
| 6,770,714 | B2 | * | 8/2004 | Ommundsen et al. ....... 525/191 |
| 2004/0171758 | A1 | | 9/2004 | Ellul et al. |

FOREIGN PATENT DOCUMENTS

| EP | 0769361 | 4/1997 |
| EP | 1 207 034 A1 | 11/2001 |
| JP | 2001-187405 | 7/2001 |
| JP | 2002194095 A | 7/2002 |

* cited by examiner

Primary Examiner—Nathan M Nutter

(57) ABSTRACT

A process for the for the preparation of dynamically vulcanized thermoplastic elastomers is described. The process comprises melt processing under high shear conditions A) at least one thermoplastic engineering resin, B) at least one vulcanizable rubber, C) a curing agent or curing agents, and D) at least one additional thermoplastic engineering resin in the form of solid particles having an effective diameter of not less than 0.05 mm, wherein said solid particles D) are added to a molten mass of A), B) before, during or after the addition of C) but prior to substantial completion of the vulcanization of B). The process provides a means to avoid substantial degradation or unwanted cross-linking of the thermoplastic engineering resin and provides a means of controlling the reaction temperature during the curing, vulcanization, or cross-linking of the rubber.

20 Claims, No Drawings

PROCESS FOR PREPARING THERMOPLASTIC ELASTOMERS BY DYNAMIC VULCANIZATION

FIELD OF INVENTION

The invention relates to methods of preparing thermoplastic elastomers by dynamic vulcanization. Thermoplastic elastomers are plastic in the sense of being melt formable and elastomeric in possessing elastic characteristics. Thermoplastic vulcanizates are a class of thermoplastic elastomers where a cross-linked rubber forms a dispersed elastomeric phase within a thermoplastic phase of engineering resin such that thermoplastic elastomer properties are achieved.

BACKGROUND OF INVENTION

Thermoplastic vulcanizate elastomers, or TPV compositions, are conventionally produced by dynamic vulcanization. Dynamic vulcanization is a process whereby a rubber component is crosslinked, or vulcanized, under intensive shear and mixing conditions within a blend of at least one non-vulcanizing thermoplastic polymer component while at or above the melting point of that thermoplastic. See, for example U.S. patents U.S. Pat. Nos. 4,130,535, 4,594,390 and 6,147,160. Dynamically vulcanized thermoplastic elastomers (thermoplastic vulcanizates) consequently have a combination of both thermoplastic and elastic properties.

Conventional plastic processing equipment can extrude, inject, or otherwise mold, and thus press and shape TPV compositions into useful products. These thermoplastic vulcanizates can be made light in weight and attractive, with good durability, and can be reprocessed at the end of their product life to produce a new product. For these reasons, thermoplastic vulcanizates are widely used in industry, for example as auto parts, such as dashboards and bumpers, air ducts, weatherseals, fluid seals, and other under the hood applications; as gears and cogs, wheels and drive belts for machines; as cases and insulators for electronic devices; as fabric for carpets, clothes and bedding and as fillers for pillows and mattresses; and as expansion joints for construction. They are also widely used in consumer goods, being readily processed, capable of coloration as with other plastics, and providing elastic properties that can endow substrate materials, or portions thereof, for instance harder plastics or metals, in multi-component laminates, with a "soft touch" or rebound properties like rubber.

Thermoplastic vulcanizates can be prepared by dynamic vulcanization in Banbury mixers, roll mixers and other types of shearing, melt processing mixers. Because of the advantages of a continuous process, such materials can be prepared in single screw or multi-screw extruders; typically twin-screw extruders are used. Twin-screw extruders are typically available having screw diameters from 25 mm to about 380 mm. In such extruders there can be local "hot spots" created by one or both by the energy of shearing and mixing and exothermic cross-linking reactions. This can lead to some instances of polymer degradation either of the thermoplastic resin or of the rubber, unintended reactions of reactive materials, and a resulting loss of final product properties including the appearance in those products of surface spots. Also some thermoplastics can have adverse reactions, in the sense of being unwanted, with the curing agents, or cross-linking agents, for the rubber.

Surface spot, surface roughness, or "fish eyes" problems with the use of twin screw extruders have been observed when dynamic vulcanizates are proposed for sheets or surfaces. EP 1 207 034 A1 describes this problem and proposes a solution where the screw configuration is adapted for decreasing shear-derived heat generation and which is said to decrease fish eyes. Similarly EP 0 769 361 addresses the formation of small projections (fish-eyes) and bad external appearance through elevation of temperature that creates an unbalance between the dispersion and the reaction rate which is being increased by the temperature increase. Again screw configuration is proposed as a means of reducing the observed problems.

U.S. Pat. No. 6,610,786 B1 describes a thermoplastic elastomer exhibiting scarce tendency of depositing gummy crust around the extrusion die upon extrusion. The description attributes this to the process steps of reducing the amount of polypropylene (PP) present during the peroxide curing of the rubber, and subsequent introduction of additional melt-kneaded PP subsequent to the curing of the rubber.

SUMMARY OF INVENTION

This invention addresses improving the properties of thermoplastic elastomers prepared by dynamic vulcanization, particularly where adverse interaction between a thermoplastic engineering resin and curing agents occurs, or where local reaction temperatures occurring during dynamic vulcanization are to be controlled, and where surface spots are occurring on extrudates of the thermoplastic elastomers. This is accomplished by a process that comprises melt processing under high shear conditions A) at least one thermoplastic engineering resin, B) at least one vulcanizable rubber, C) a curing agent or curing agents, and D) at least one additional thermoplastic engineering resin in the form of solid particles having an effective diameter of not less than 0.05 mm, wherein said solid particles D) are added to a molten mass of A) and B) before, during or after the addition of C) but prior to substantial completion of the vulcanization of B). The process includes one or more steps wherein at least one process oil is added during melt processing before, during or after, or some combination thereof, the completion of the vulcanization of B).

The process is particularly applicable wherein the curing agents C) comprise an organic peroxide compound, wherein the thermoplastic engineering resin A) is a propylene-based or ethylene-based homopolymer or copolymer, and wherein the solid particles D) comprise a propylene-based or ethylene-based homopolymer or copolymer that is the same or different from that of the engineering resin A).

In a particularly preferred embodiment, the invention is a process for the preparation of dynamically vulcanized thermoplastic elastomers comprising melt processing under high shear conditions: A) a propylene-based homopolymer or copolymer having a melt temperature ($T_m$) by DSC from about 80° C. and 180° C. and melt flow rate (MFR) by ASTM-D1238 (at 230° C. and 2.16 kg) of less than 1.2 dg/min; B) an EPDM rubber; C) at least one organic peroxide curing agent, and D) solid particles of an additional propylene-based homopolymer or copolymer that is the same or different as A); wherein said solid particles D) are added during said melt processing prior to substantial completion of the vulcanization of B).

DETAILED DESCRIPTION OF THE INVENTION

Thermoplastic, dynamically vulcanized elastomers comprise, as a minimum, a continuous thermoplastic phase comprising one or more thermoplastic engineering resins and a crosslinked, or vulcanized, rubber discontinuous phase. The rubber phase can as well be comprised of more than one rubber component so long as vulcanizable as well. Additional uncrosslinked thermoplastic resins, including uncrosslinked elastomers, can as well be included in the continuous thermoplastic phase, and can in some instances additionally be partially incorporated in the crosslinked rubber phase, thus creating interfacial adhesion and increased compatibility between the continuous and discontinuous phases. Process oils, in addition to any extender oils in the rubber, or other polymeric components, are optionally introduced to improve processing at various locations in the process. Traditional fillers, reinforcing fibers, additives, colorants, and the like, can be added before or after extrusion of the TPV compositions from the melt processing extruder. Examples of such materials are described in U.S. Pat. No. 3,037,954, U.S. Pat. No. 4,311,628, U.S. Pat. No. 4,594,390, U.S. Pat. No. 4,654,402, U.S. Pat. No. 5,397,839, U.S. Pat. No. 5,589,544, U.S. Pat. No. 5,656,693, U.S. Pat. No. 5,672,660, U.S. Pat. No. 5,783,631, U.S. Pat. No. 5,910,543 and U.S. Pat. No. 6,207,752; these documents are incorporated by reference, or referred to herein for their description of suitable thermoplastics, rubbers, curing agents, additives, oils, fillers, and the like. Typically, the TPV compositions described can be pelletized by methods commonly used in the plastics processing art. The TPV pellets so prepared can be further melt processed with other conventional components or additives in compounding, for thermoplastic molding or shaping into final products:

The rubber component of the TPV is generally present as small, i.e. micro size, particles dispersed within a continuous thermoplastic matrix, although a co-continuous morphology or a phase inversion is also possible depending upon the amount of rubber relative to thermoplastic resin and the degree of vulcanization, if any, of the rubber. The rubber is to be at least partially vulcanized, and most preferably, it is fully vulcanized (crosslinked).

The partial or full crosslinking can be achieved by adding an appropriate rubber curative to the blend of thermoplastic and rubber, and vulcanizing the rubber to the desired degree under vulcanizing conditions wherein the solid particles of thermoplastic engineering resin are introduced in one or more locations such that the particles are present during the vulcanization, or crosslinking, of the rubber. Such dynamic vulcanization conditions are well-known, see for example the prior art discussed above. The disclosures of these, those relating to dynamic vulcanization conditions and processes are suitable for one skilled in the art to practice the invention, and are incorporated by reference. See, also, S. Abdou-Sabet, R. C. Puydak, and C. P. Rader, "Dynamically Vulcanized Thermoplastic Elastomers", *Rubber Chemistry and Technology*, V. 69, No. 3, July-August 1996, and references cited therein. The addition of other polymeric components and optional additives, fillers, oils, etc., is to be conducted to assure effective melt mixing but can be accomplished prior to or subsequent to the rubber crosslinking reaction, or in a combination of such introduction points. Care should be taken such that interaction of the curative with such additional components is taken into account, and the reverse, interaction of the additives with the curing agents. Such selection is well within the skill in the art or can be determined empirically.

Those of ordinary skill in the art will appreciate the appropriate quantities and types of vulcanizing agents, and the conditions required to achieve the desired vulcanization. Any known crosslinking system can be used, so long as it is suitable under the vulcanization conditions for the elastomer component and it is compatible with the thermoplastic polymer component of the composition. Crosslinking (curing) agents include sulfur, sulfur donors, metal oxides, phenolic resin systems, maleimides, peroxide based systems, hydrosilylation systems, high energy radiation and the like, both with and without initiators, accelerators, catalysts and other co-agents. The curative systems described in U.S. Pat. Nos. 4,311,628, 6,207,752 and 6,291,587 are particularly suitable, and are incorporated by reference. Curing agents and their co-agents can be added together, for example at the feed throat, or can be added separately, for example one at the feed throat and one further downstream where curing is to be initiated.

In the practice of this invention, the amounts of the various traditional components will be those known by those skilled in the art. Such amounts are typically quantified in units of "phr", that is parts by weight of the specified component per one hundred parts rubber (or elastomeric polymer). Thus the total amount of thermoplastic contributed by the A) thermoplastic resin and the D) solid particles of thermoplastic resin will range broadly from about two (2) to four hundred (400) phr, typically from about five (5) to about three hundred fifty (350) phr, and most typically from about twenty (20) to about three hundred (300) phr. The ratio of the D) solid particles to the A) resin is best expressed as the ratio of D) to the sum of A) plus D). Therefore, the D) particles will typically be used in amount such that the particles make up from 5 to 95 wt. % of the total of the amounts of A) plus D), and preferably from 15 to 90 wt. %.

The invention process is particularly suited to dynamic vulcanization where unwanted interaction between reagents can occur during the melt blending or cross-linking reaction. For example, free-radical forming crosslinking agents can be used in the presence of one or more thermoplastic resins that can be chemically degraded or cross-linked by the crosslinking agents. For example, polypropylene homopolymer or copolymer chains are subject to beta-scission reactions in the presence of peroxide-based, or other free radical source, crosslinking or curing agents. Polyethylene homopolymer or copolymers are subject to unwanted cross-linking reactions in the presence of free-radical sources. The reduction in the presence of the propylene-based or ethylene-based thermoplastic polymers in a reactive molten state, and introduction of the solid thermoplastic particles, being substantially less reactive while in solid form, allows the curing agents to become more available for the rubber curing reactions, thus increasing the reaction kinetics of the cross-linking reaction, and thus reducing the effects of beta scission or cross-linking of the thermoplastic resin. Similarly, polyester thermoplastic resins can be degraded by the use of halogen donators with phenolic cure systems and can benefit from the invention process where the thermoplastic is added in at least part as solid particles at or near the curing zone. Some functionalized polymers, those having reactive functionality for purposes of improving adhesiveness and the like, can be used as at least part of the thermoplastic resin and can interfere with the curing agent. An example is maleic-anhydride functionalized plastics, like PP-g-Manh, which will interact with peroxide curatives to reduce their overall rubber cross-linking efficiency. Providing at least some part of the functionalized plastic as a solid particle will reduce the interaction with curative throughout a significant portion of the curing reaction time.

Further, the absorption of heat by the in situ melting of the solid particles, serves to provide local temperature control within the reactive processing. This is in addition to, and can be used to some extent instead of, conventional temperature control means, e.g., by external cooling of the melt processing equipment, e.g., extruder casing or barrel, and requirements to reconfigure extruder screw configurations (see prior art). Furthermore, the kinetic movement of the thermoplastic solid particles in and around the mixing blades, screw flights, and the like in melt processing equipment, is believed to increase the shear forces being exerted on the polymeric chains, and accumulations of them, in the molten thermoplastics such that more effective mixing and diminution of dispersed rubber particle size occurs. This increases the efficiencies of the dynamic vulcanization process. These reaction control benefits are applicable broadly to all suitable thermoplastics and crosslinkable rubbers, not just where adverse interaction between a thermoplastic engineering resin and curing agent is to be avoided.

To achieve the best effects of the invention process, the solid particles can be added to the molten polymeric mass just prior to or just after the initiation of the rubber curing in the melt processing equipment, for example by side feeder or crammer feeder just prior to or into the curing zone of a twin or higher multi-screw extruder, when said particles have a mass temperature of less than or equal to about 100° C. Temperatures as low as room temperature (20° C.) will be most suitable for the solid pellets, but any moisture or oxygen that may have been present should have been minimized, such as by drying under a vacuum, or other means. In particular, the use of nitrogen purging for oxygen removal is preferred. The solid particles, e.g., pellets, or other particulate material, such as granulates, etc., typically will have a mean particle size diameter of about 1 to 7 mm, or larger, but preferably will have a size of about 2-5 mm.

In another embodiment, the solid particles can be introduced at or near the feed throat of a twin or multi-screw extruder, if such have a higher melt temperature ($T_m$) than the A) thermoplastic resin being used as the molten thermoplastic for reactive processing. For example, D) pellets of the higher melting thermoplastic with the lower melting thermoplastic A) may be added together. Since both may be introduced as solid particles they can be physically blended prior to introduction to assist good dispersion of the solid particles and effect on temperature control throughout the blending and curing steps of dynamic vulcanization. In this manner, the lower melt temperature thermoplastic will be molten prior to the cure zone and the higher melt temperature thermoplastic will remain in solid pellet form though diminishing in size. For example, using polypropylene or polyethylene homopolymers and copolymers thermoplastics for the higher melting point particles will have a $T_m$ of about 135° C. to 180° C. (even as high as 250° C., with polar engineering resins) and the lower melting polymer, whether added molten or solid, will have a melting point of about 80° C. to 135° C. It will be apparent that at the mid point of the combined range, the lower melting thermoplastic $T_m$ should be at least about 10° C. to 20° C. lower than that of the higher melting solid particles.

For processing using this embodiment, the blend temperature in the processing equipment should be adjusted from room temperature, or higher, up to above that of the lower melting thermoplastic but lower than that of the higher melting thermoplastic. The temperature should be maintained at or above this temperature, but below the Tm of the higher melting thermoplastic, for sufficient time to effect good melt mixing of the rubber and the lower melting thermoplastic. Near or at the beginning of the cure zone, or within it, the temperature should be adjusted or allowed to exceed the Tm of the higher melting thermoplastic. In this manner, it is possible to prepare higher service temperature dynamic vulcanizates, particularly where the lower melting point thermoplastic is used sparingly and the higher melting point particles contain the majority of thermoplastic resin to be comprised in the thermoplastic vulcanizate. In this embodiment, or any in which two, or more, different melting point thermoplastics are used, it will be important to assure that the thermoplastics selected are at least partially compatible so as to assure end product quality.

The rubber may be partially of fully cured or cross-linked. In preferred embodiments, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 15 weight percent, in other embodiments not more than 10 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice.

Curatives that may be used in the invention can be any of those known to those skilled in the art for processing thermoplastic vulcanizates, including peroxides, silicon hydrides, phenolic resins and free radical initiators. The curatives may be added in one or more locations, including the initial feed hopper of the extruder. Usually 1.5 to 30 parts by weight of the crosslinking or curing agent, or curing system, (with coagents) are used per 100 parts by weight of the rubber component to be vulcanized in order to achieve partial levels of cure, at the low end to high levels of cure, such as being fully cured, at levels at or above about 3-8 parts by weight, depending upon the total compound weight of the curing agents. High levels of cure are particularly advantageous where the elastomeric properties are to be as equivalent as possible to those of vulcanized rubber not having thermoplastic characteristics.

The thermoplastic resin used in the invention is a solid plastic material. Preferably, the resin is a crystalline or a semi-crystalline polymer resin, and of such, more preferably is a resin that has a crystallinity of at least 10 percent as measured by differential scanning calorimetry. Polymers with a high glass transition temperature, e.g., non-crystalline glassy engineering plastics, are also acceptable as the thermoplastic resin. Resins suitable generally are those with a melt temperature lower than the decomposition temperature of the rubber. Thus both polar and non-polar engineering resins can be utilized in the current invention. See the descriptions in the above listed patents. As noted therein, often thermoplastic polyolefins are preferred in view of availability and suitability with polyolefin based rubbers, both being economic, high performing, and environmentally non-hazardous. As used herein, reference to a thermoplastic resin includes a mixture of two or more different thermoplastic resins or a blend of one or more compatibilizers and two or more engineering plastics.

Exemplary thermoplastic resins include crystallizable polyolefins (such as homopolymers and copolymers of ethylene or propylene, and copolymers with cyclic olefins), polyimides, polyamides (nylons), polyesters, thermoplastic copolyesters or copolyamides, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, polymethymethacrylates, fluorine-containing thermoplastics and polyurethanes. The preferred thermoplastic resins are crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. For example, known ethylene-based homo- and copolymers having ethylene crystallinity are suitable. Commercial products include high density polyethylene (HDPE), linear low density polyethylene (LLDPE), and very low density polyethylene (VLDPE, or plastomers). Propylene-based homopolymers and copolymers, such as isotactic polypropylene and crystallizable copolymers of propylene and ethylene or other $C_4$-$C_{10}$ alpha-olefins, or diolefins, having isotactic propylene crystallinity, are preferred. Copolymers of ethylene and propylene or ethylene or propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof are also suitable. These will include reactor polypropylene copolymers and impact polypropylene copolymers, whether block, random or of mixed polymer synthesis. These homopolymers and copolymers may be synthesized by using any polymerization technique known in the art such as, but not limited to, the "Phillips catalyzed reactions," conventional Ziegler-Natta type polymerizations, and organometallic, single-site olefin polymerization catalysis exemplified by, but not limited to, metallocene-alumoxane and metallocene-ionic activator catalysis.

Preferred polyolefin thermoplastic resins preferably have a weight average molecular weight ($M_w$) from about 50,000 to about 600,000, and a number average molecular weight ($M_n$) from about 50,000 to about 200,000. More preferably, these resins have a $M_w$ from about 150,000 to about 500,000, and an $M_n$ from about 65,000 to about 150,000. The molecular weight can typically be determined by gel permeation chromatography (GPC) using a suitable standard for the thermoplastic being measured. Additionally, $M_n$ and polymer structure can be measured using Differential Refractive Index (DRI) detectors and $M_w$ can be measured using Low Angle Light Scattering (LALLS). ASTM D 6474 provides a general description for polyolefins, see also ISO 11344 and T. Sun, Macromolecules, Vol. 34, page 6812 (2001) for adaptation for synthetic rubber.

Additionally, cyclic olefin copolymers can be used as high melting point thermoplastic polyolefin engineering resins, see for example, U.S. Pat. Nos. 5,324,801 and 5,621,504. Preferred cyclic olefins include cyclobutene, cyclopentene, cyclooctene, norbornene, 5-methyl-norbornene, 3-methyl-norbornene, ethyl-norbornene, phenyl-norbornene, dimethyl-norbornene, diethyl-norbornene, dicyclopentadiene, tetracyclododecene, methyltetracyclododecene, and the like. Lower carbon number alpha-olefins, e.g., $C_3$-$C_8$, can be used as comonomers, for disruption of cyrstallinity and reduction of melting point. Ethylene is a particularly preferred comonomer in the cyclic olefin copolymers.

The thermoplastic crystalline or semi-crystalline resins generally have a melt temperature (Tm) that is from about 40 to about 350° C., preferably from about 60 to about 210° C., more preferably from about 90 to about 180° C., and even more preferably from about 120 to about 170° C. The glass transition temperature (Tg) of these resins is from about −25 to about 10° C., preferably from about −5 to about 5° C. More generally speaking, including the semi-crystalline and glassy polar engineering resins, useful resins will have a Tg of up to and greater than 100° C., and even greater than 150° C. The characterizing temperatures are can be determined by DSC according to the test method of ASTM D-3418.

An especially preferred commercially available thermoplastic resin is highly crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 35 dg/min, and preferably less than or equal to 5.0 dg/min, and more preferably less than 1.2 dg/min, and most preferably less than or equal to 0.8 dg/min per ASTM D-1238. Melt flow rate is a measure of how easily a polymer flows under standard pressure, and is measured by using ASTM D-1238 at 230° C. and 2.16 kg load.

Elastomers suitable for use in the compositions of the invention are at least partially compatible with the thermoplastic engineering resins and have reactive cure sites. Thus thermoplastic polyolefin engineering resins will typically be used with cross-linkable, non-polar olefinic rubbers. The polar engineering resins, or thermoplastics, are combined typically with cross-linkable polar rubbers, or combined polar and non-polar rubbers, often with appropriate compatibilizers, see the patent literature above, para. [0010]. The cure sites can either be an integral part of the elastomer backbone or can be incorporated by additional functional groups. As used herein, reference to an elastomer includes a mixture of two or more elastomers.

Unsaturated non-polar rubbers useful to prepare thermoplastic elastomers according to the invention include monoolefin copolymer rubbers comprising non-polar, rubbery copolymers of two or more monoolefins (EPR rubber), preferably copolymerized with at least one polyene, usually a diene (EPDM rubber). EPDM is a polymer of ethylene, propylene and one or more non-conjugated diene(s), and the monomer components may be polymerized using Ziegler-Natta, metallocene, or other organometallic compound catalyzed reactions. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB); divinyl benzene, and the like, or combinations thereof. Such elastomers have the ability to produce thermoplastic vulcanizates with a cure state generally in excess of about 95 percent while maintaining physical properties attributable to the crystalline or semi-crystalline polymer.

The preferred diene monomers are 5-ethylidene-2-norbornene and 5-vinyl-2-norbornene. In the event that the copolymer is prepared from ethylene, alpha-olefin, and diene monomers, the copolymer may be referred to as a terpolymer or even a tetrapolymer in the event that multiple olefins or dienes are used.

The elastomeric copolymers contain from about 20 to about 90 mole percent ethylene units derived from ethylene monomer. Preferably, these copolymers contain from about 40 to about 85 mole percent, and even more preferably from about 50 to about 80 mole percent ethylene units. Furthermore, where the copolymers contain diene units, the diene units can be present in an amount from about 0.1 to about 5 mole percent, preferably from about 0.1 to about 4 mole percent, and even more preferably from about 0.15 to about 2.5 mole percent. The balance of the copolymer will generally be made up of units derived from alpha-olefin monomers. Accordingly, the copolymer may contain from about 10 to about 80 mole percent, preferably from about 15 to about 50 mole percent, and more preferably from about 20 to about 40 mole percent alpha-olefin units derived from alpha-olefin monomers. The foregoing mole percentages are based upon the total moles of the polymer.

Butyl rubbers are also useful in the thermoplastic elastomer compositions. As used in the specification and claims, the term butyl rubber includes copolymers of an isoolefin and a conjugated diolefin, terpolymers of an isoolefin with or without a conjugated diolefin, divinyl aromatic monomers and the halogenated derivatives of such copolymers and terpolymers. The halogenated versions thereof are particularly useful, especially brominated butyl rubber. Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from 0.1 to 10 weight percent A preferred example is the brominated copolymer of isobutylene and para- methylstyrene. These copolymers are more fully described in U.S. Pat. No. 5,162,445, the disclosure of which is incorporated herein by reference.

Suitable elastomeric copolymers for use with polyolefin engineering resins, includes the cyclic olefin copolymer rubbers known in the art, see U.S. Pat. No. 6,121,383. Such are particularly suitable with the high melting point cyclic olefin copolymer engineering resins.

The elastomeric copolymers preferably have a weight average molecular weight that is greater than about 200,000, more preferably from about 300,000 to greater than about 1,000,000, even more preferably from about 400,000 to greater than about 700,000. These copolymers preferably have a number average molecular weight that is greater than about 70,000, more preferably from about 100,000 to about 350,000, even more preferably from about 120,000 to about 300,000, and still more preferably from about 130,000 to about 250,000. Elastomers, especially those in the high end of the molecular weight range, are often oil extended in the manufacturing process and can be directly processed as such in accordance with the invention process.

Useful elastomeric copolymers preferably have a Mooney Viscosity ($M_L(1+4@125°$ C.)) of from about 20 to about 450, more preferably from about 50 to about 400, and even more preferably from about 80 to about 350, where the Mooney Viscosity is that of the non-oil extended elastomer or is that before adding oil to an oil-extended elastomer.

The vulcanizable elastomer can also be natural rubbers or synthetic homo- or copolymers of at least one conjugated diene with an aromatic monomer, such as styrene, or a polar monomer such as acrylonitrile or alkyl-substituted acrylonitrile monomer(s) having from 3 to 8 carbon atoms. Those rubbers are higher in unsaturation than EPDM rubber or butyl rubber. Those rubbers can optionally be partially hydrogenated to increase thermal and oxidative stability. Desirably those rubbers have at least 50 weight percent repeat units from at least one conjugated diene monomer having from 4 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

The synthetic rubber can be nonpolar or polar depending on the comonomers. Examples of synthetic rubbers include synthetic polyisoprene, polybutadiene rubber, styrene-butadiene rubber (SBR), butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers with other than polar engineering resins, as is well known to those skilled in the art.

Examples of organic peroxides that may be used as curing agents include di-tert-butyl peroxide, dicumyl peroxide, t-butylcumyl peroxide, alpha-alpha-bis(tert-butylperoxy)diisopropyl benzene, 2,5 dimethyl 2,5-di(t-butylperoxy)hexane, 1,1-di(t-butylperoxy)-3, 3,5-trimethyl cyclohexane, n-butyl-4, 4-bis(tert-butylperoxy) valerate, benzoyl peroxide, lauroyl peroxide, dilauroyl peroxide, 2,5-dimethyl-2, 5-di(tert-butylperoxy) hexene-3, and in general, diaryl peroxides, ketone peroxides, peroxydicarbonates, peroxyesters, dialkyl peroxides, hydroperoxides, peroxyketals and combinations thereof. Azo initiators such as Luazo® AP (available from ATO Chemical) may also be used as free radical initiators.

In addition to the peroxide, other cure adjuvants or coagents can be used to initiate or accelerate the cross-linking reaction. Examples are triallyl cyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, polyfunctional methacrylates, acrylate and methacrylate metal salts, and oximer, e.g. quinone dioxime.

Hydrosilylation has also been disclosed as a crosslinking method for thermoplastic vulcanizates and is suitable in the process of the invention. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethyl-siloxane copolymers, alkyl methyl polysiloxanes, bis(dimethylsilyl)alkanes and bis(dimethylsilyl)benzene. See, U.S. Pat. Nos. 5,672,660, and 6,150,464, for further description, both are incorporated by reference.

Platinum-containing catalytic coagents which are useful in the process of the invention are described, for example, in U.S. Pat. No. 4,578,497; U.S. Pat. No. 3,220,972; and U.S. Pat. No. 2,823,218, all of which are incorporated herein by reference. These catalysts include chloroplatinic acid, chloroplatinic acid hexahydrate, complexes of chloroplatinic acid with sym-divinyltetramethyldisiloxane, dichloro-bis(triphenylphosphine) platinum (II), cis-dichloro-bis(acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by reference. Coagents often include stabilizers, for avoiding unwanted side reactions, see the patent literature cited.

Any phenolic curative which fully cures EPDM rubber is suitable in the practice of the invention. The use of conventional phenolic resin curatives for crosslinking EPDM in a thermoplastic elastomer is disclosed in U.S. Pat. No. 4,311,628, which is incorporated by reference for its teachings thereon. See also, the dibenzyl ether modified phenolic resins of U.S. Pat. No. 4,952,425, also incorporated by reference for its teachings. For further details of phenolic curative systems see "Vulcanization and Vulcanizing Agents," W. Hoffman, Palmerton Publishing Company. Suitable phenolic curing resins and brominated phenolic curing resins are commercially available under the trade names SP-1045, CRJ-352, SP-1055 and SP-1056 from Schenectady Chemicals, Inc. Similar functionally equivalent phenolic curing resins may be obtained from other suppliers. Coagents, halogen donors and/or metal oxides, are typically used with phenolic resins as noted in the literature.

Often the engineering resin and dynamically vulcanized alloys of the composition may be combined in the presence of a compatibilizer for these components. The compatibilizer provides interfacial adhesion between the vulcanizate and the engineering resin. In conventional processing, without the compatibilizer, blends of engineering resin and vulcanizate may often have poor mechanical elongation properties, the weak interfaces between the components may fail, and the components may delaminate. Compatibilizers include block copolymers having one block that is compatible with one component and at least one other block that is compatible with at least one other of the principal components. Other examples would include functionalized polymers having a backbone polymer that is compatible with one of the principal components and a graft moiety that is either compatible or reactive with at least one of the other principal components.

Compatibilizer forming materials may also be used. The compatibilizer can be formed by the direct interaction of segments containing the functional groups present in the major components, i.e. the engineering resin and the vulcanizate, or by interaction with another bi- or multi-functional compound. Specific examples include hydrogenated styrenic block copolymers, especially those with a polyolefin midblock, for example SEBS, SEPS, and SEEPS. Functionalized polymers particularly suitable as compatibilizers include maleated polyolefin polymers such as PP-g-Manh, EPDM-g-Manh, and SEBS-g-Manh. Such compatibilizers are known in the art, e.g. in U.S. Pat. No. 4,455,545 and Journal of Macro Molecular Science Chemistry, A26(8), 1211 (1989).

The compatibilizer will typically be present in a compatibilizing amount, e.g., from 3-20 wt. %, based upon the total weight of the composition, preferably 5-15 wt. %, and more preferably 5-10 wt. %.

Fillers can be inorganic fillers, such as calcium carbonate, clays, silica, talc, titanium dioxide, or organic carbon black, glass, combinations thereof, and the like. Such may be in the form of fibers, beads or powders, or may be masterbatched with polymeric carriers. Any type of carbon black can be used, such as channel blacks, furnace blacks, thermal blacks, acetylene blacks, lamp blacks, combinations thereof and the like. Typically such fillers are used in an amount from about 5 to 150 phr (parts per hundred parts rubber).

Known additives for thermoplastics and elastomers (rubber) can be added to compositions prepared in accordance with the invention. Such include processing aids, stearic acid, stabilizers, anti-degradants, flame retardants, tackifiers, wax, discontinuous fibers (glass, cellulose, polyester, etc.). The additives can be added during the preparation of the vulcanizate or the preparation of the finished composition or both, provided that the total amount of the additives does not exceed about 15 weight percent, based on the total thermoplastic elastomer composition, including the additives, more typically less than or equal to 10 wt. %, and most typically from 0.5-5.0 wt. %.

Extender and process oils are particularly useful in the reactive processing of the invention. Rubber extender and process oils have particular ASTM designations depending on whether they fall in a class of paraffinic, naphthenic, or aromatic process oils derived from petroleum fractions. The type of process oils utilized will be customarily used in conjunction with the rubber component. The ordinary skilled person will recognize which type of oil should be utilized for a particular rubber, for instance paraffinic oils, particularly those low in napthenic or aromatic content, are typically used with polyolefin-based thermoplastics and elastomers. The quantity of rubber process oil utilized is based on the total rubber content, both cured and uncured, and can be defined as the ratio by weight of the process oil to the total rubber in the thermoplastic vulcanizate. This ratio can vary from about 0 to about 3.0/1, preferably from about 0.2:1 to about 2.5:1, more preferably from about 0.3:1 to about 1.5:1. Larger amounts of process oil can be used, the effect being generally reduced physical strength of the composition. Oils other than petroleum-based oils, such as oils derived from coal tar and pine tar can also be utilized. In addition to petroleum-derived rubber process oils, oligomeric and low molecular weight polymer oils from unsaturated monomers separated from petroleum fractions, organic esters and other known synthetic plasticizers can be used. Plasticizers suitable for these compositions are covered in U.S. Pat. No. 5,290,886, and U.S. Pat. No. 5,397,832 incorporated herein by reference.

The invention is further illustrated with reference to the following examples. In these examples test methods used are identified by the standards identified except for Melt Filtration, Surface Spot Count, and Weight Gain. These are described below.

The Melt Filtration Count was conducted by extruding a measured quantity of sample material through a filtration screen and counting the particles screened from the melt. Pellets of the example material (250 g.) were fed to a single screw melt processing extruder having a 25.4 mm (1 in.) diameter screw with a 24:1 L/D and a compression ratio of 3:1 and extruded though a 4.7 mm (3/16") rod die into a spacer transition piece fitted with two 25.4 mm (1") stainless steel filtering screens of a) 120 mesh (120 per 6.4516 cm$^2$) and b) 20 mesh (20 per 6.4516 cm$^2$). The barrel section temperatures were maintained within ±3° C. (5° F.) of set points of 163° C. (325° F.) (Rear Zone), 177° C. (350° F.) (Middle Zone), 191° C. (375° F.), 200° C. (390° F.) (Die). The screw was rotated at 40 RPM. The extruder was purged by running through sample material under test through the barrel for 5 minutes. Thereafter 75 g±5 g was extruded through the die and screen. The filtering unit (with screens) was removed and the remainder of material run out. The screens were cooled in water. They were then set up with a grid to aid counting centered under a microscope set to 6× magnification. The number of inclusions removed by filtration were counted. Each sample was run three times and the average of the three is reported.

The Surface Spot Count was conducted using the same single screw extruder in the same manner as for the Melt Filtration Count but with different barrel section temperature set points and a strip die of 2.54 cm (1") width and 0.5 mm (0.019") thick and 7 to 10 mm (0.25 to 0.40") land length. The barrel section temperatures were maintained within ±3° C. (5° F.) of set points of 180° C. (356° F.) (Rear Zone), 190° C. (374° F.) (Middle Zone), 200° C. (392° F.), 205° C. (400° F.) (Die). Pellets of example material weighing 1 kg (2.2 lbs.) was fed into the hopper of the extruder and the screw rotation was adjusted maintain an output rate of 50 g per minute as determined by collecting material exiting the die for 1 min and weighing the output. This flow rate is critical since slower rotation can create false results, e.g., better surface. Additional flushing with example material of up to 5 minutes was conducted to clear the extruder. Thereafter extruded example material as strip from the die was allowed to fall freely until reaching the floor. A piece of cardboard sufficient to old a 30.5 cm (12") strip was placed at the underside of the die exit and rotated quickly to catch the strip without further draw down. The ends of the strip off the board were trimmed and the strip on the board was allowed to cool at room temperature. This was repeated to prepare three strips. The strips were each inspected visually in a randomly chosen 15 cm (6") section through a 3 diopter (1.75 power) using Electrix Model 7426 light with 100 watt illumination. All spots having an area equal to greater than 0.80 mm$^2$ (0.001 in$^2$) (suing a TAPPI chart) were counted. The median value of the three tests are reported.

The weight gain was obtained by measuring weight change after immersing thermoplastic vulcanizate sample strips (25×35×2 mm, cut from injection molded plaques) in IRM Oil at 121° C. for 24 hrs. based on the methods of ASTM D471.

EXAMPLE 1

The process of the invention was conducted using a Wemer& Pfleiderer co-rotating twin screw extruder, model ZSK-53. The extruder consisted of 12 barrel sections, inner barrel diameter was 53.4 mm and the length of each barrel section was 182 mm. The extruder had two 30 mm thickness supports and the total L/D of the extruder was 42:1. The extruder had a feed throat at the first barrel and vacuum vent ports at the 6$^{th}$ and 11$^{th}$ barrel sections. Total extrusion output was 70 Kg/hr and extruder rpm was 350. Barrel section temperature was set as noted below. In this and the following examples, amounts are quantified in phr unless otherwise specified.

| Barrel Temperature Profile (in ° C.) | | | | | | | | | | | | |
|---|---|---|---|---|---|---|---|---|---|---|---|---|
| | #1 | #2 | #3 | #4 | #5 | #6 | #7 | #8 | #9 | #10 | #11 | #12 |
| Temperature | 130 | 130 | 130 | 130 | 130 | 130 | 130 | 130 | 130 | 140 | 140 | 160 |

Oil-extended EPDM (50 M$_L$(1+4 at 125° C., 64 wt. % ethylene and 4.3 wt. % 2,5-ethylidene-norbornene content (Vistalon® 3666, ExxonMobil Chemical Co.)) (containing 75 phr process oil) was granulated by a rubber granulator and partitioned with 41 phr clay (Icecap K®, Burgess Pigment Co.) in a Little Ford™ mixer. Next 43.8 kg/hr of the granulated EPDM and clay blend was fed to the feed-throat of the main twin screw extruder. A powder mixture of 32.66% zinc oxide (Kadox® 911, Zinc Corp. of America), 50.51% triallylcyanurate calcium silicate (Rhein Chemie AG), and 16.84% Icecap K® clay was dry blended in a Henschel™ mixer. Then 0.6 kg/hr of the powder mixture was fed to the feed-throat of the twin screw extruder. A portion (69.5% by weight) of polypropylene homopolymer (Sunoco™ PP F008F, 0.8 MFR (melt flow rate)) was fed through the feed-throat and the rest of this polypropylene was side-fed at room temperature to the dynamic curing zone of the main extruder in solid pellet form having an average particle diameter size of 2-4 mm. Thus 8.2 kg/hr of the polypropylene was fed to the feed-throat and 3.6 kg/hr of the polypropylene was fed to the cure zone (barrel #6) by a side crammer feeder. Additionally, 1.3 kg/hr of 2,5-dimethyl-2-5di(tert-butyl peroxy)hexane (DHBP-50-WO™, Degussa Initiators, LLC) diluted with process oil (50% concentration) was injected to the main twin screw extruder at between barrel# 3 and 4. 2 0.8 kg/hr of process oil (Paralux® 6001R, Chevron Co.) was injected by injector between barrel #1 and #2. Another 7.6 kg/hr of process oil was injected between barrel #8 and 9. Lastly, 1.3 kg/hr of stabilizer slurry containing 23.08% Irganox® 1010 stabilizer (Ciba Specialty Chemicals) and 76.92% Paralux® process oil was fed between barrel #9 and #10 by a slurry feeder.

EXAMPLE 2

From the same raw materials, same twin screw extruder, and same extruder conditions as in Example 1, a soft composition was made by feeding relatively less amount of polypropylene (below).
EPDM and clay blend: 44.9 kg/hr
Powder mixture: 1.2 kg/hr
PP to feed-throat: 7.3 kg/hr
PP pellet to cure zone: 3.1 kg/hr
2,5-dimethyl-2-5di(tert-butyl peroxy)hexane diluted with process oil: 1.4 kg/hr
Process oil between barrel #2 and #3: 2.9 kg/hr
Process oil between barrel #8 and #9: 7.8 kg/hr
Stabilizer slurry: 1.4 kg/hr

EXAMPLE 3

From the same raw materials, same twin screw extruder, and same extruder conditions as in Example 1, a hard composition was made by feeding relatively large amount of polypropylene (below).
EPDM and clay blend: 42.4 kg/hr
Powder mixture: 1.2 kg/hr
PP to feed-throat: 9.6 kg/hr
PP pellet to cure zone: 4.1 kg/hr
2,5-dimethyl-2-5di(tert-butyl peroxy)hexane diluted with process oil: 1.3
Process oil between barrel #2 and #3: 2.7 kg/hr
Process oil between barrel #8 and #9: 7.4 kg/hr
Stabilizer slurry: 1.3 kg/hr

EXAMPLE 4

From the same raw materials, same twin screw extruder, and the same extruder conditions as in Example 1, another composition was made by feeding a larger amount of side-fed polypropylene with lesser throat-fed while maintaining total polypropylene level same.
PP to feed-throat: 6.3 kg/hr
PP pellet to cure zone: 5.6 kg/hr

EXAMPLE 5

From the same raw materials, the same twin screw extruder, and the same extruder conditions as in Example 1, another composition was made by feeding an even larger amount of side-fed polypropylene while maintaining total polypropylene level the same.
PP to feed-throat: 4.3 kg/hr
PP pellet to cure zone: 7.6 kg/hr

EXAMPLE 6

From the same raw material, the same twin screw extruder, and the same extruder conditions as in Example 1, the composition was made by feeding an even greater amount of side-fed polypropylene while maintaining total polypropylene level same.
PP to feed-throat: 2.1 kg/hr
PP pellet to cure zone: 9.8 kg/hr

COMPARATIVE EXAMPLE # 1

From the same raw material (and in the same amounts), the same twin screw extruder, and the same extruder conditions as in Example 1, side-fed polypropylene was fed in molten form to the ZSK-53 between barrel #9 and 10 from a single screw extruder, this was after the cure was substantially completed.

COMPARATIVE EXAMPLE #2

From the same raw material (and in the same amounts), the same twin screw extruder, and the same extruder conditions as in Example 2, side-fed polypropylene was fed in molten form to the ZSK-53 between barrel #9 and 10 from a single screw extruder, this was after the cure was substantially completed.

COMPARATIVE EXAMPLE #3

From the same raw material (and in the same amounts), the same twin screw extruder, and the same extruder conditions as in Example 3, side-fed polypropylene was fed in molten form to the ZSK-53 between barrel #9 and 10 from a single screw extruder, this was after the cure was substantially completed.

COMPARATIVE EXAMPLE #4 (WITHOUT SIDE-FEEDING)

This sample was produced by the use of a Werner & Pfleiderer co-rotating twin screw extruders, model ZSK-83. The extruder consists of 15 barrels, inner barrel diameter was 83.4 mm and length of a barrel was 240.7 mm. The total L/D of the extruder was 43.4:1. The extruder had a feed throat at the first barrel and vacuum vent ports at the $7^{th}$ and $14^{th}$ barrels. Total extrusion output was 270 kg/hr and extruder rpm was 350. Barrel set temperature was as noted below.

As in Example 1, EPDM containing 75 phr process oil (VISTALON® 3666) was granulated and partitioned with 41 phr clay. 168.8 kg/hr of the granulated EPDM and clay blend was fed to the feed-throat of the main twin screw extruder. A powder mixture of 32.66% zinc oxide, 50.51% triallyl cyanurate, and 16.84% clay was dry blended by Henschel™ mixer. 4.6 kg/hr of the powder mixture was fed to the feed-throat of the twin screw extruder. All polypropylene, 46 kg/hr, was fed to the feed-throat of the main extruder. 5.1 kg/hr of 2,5-dimethyl-2-5di(tert-butyl peroxy)hexane diluted with process oil (50% concentration) was injected to the main twin screw extruder at between barrel# 3 and 4. 10.9 kg/hr of process oil was injected by injector between barrel #1 and #2 and another 29.4 kg of process oil was injected between barrel #10 and 11. 5.1 kg/hr of stabilizer slurry containing 23.08% Irganox® 1010 and 76.92% process oil was fed between barrel #11 and #12 by a slurry feeder.

EXAMPLE #7

From the same raw materials, the same twin screw extruder, and the same extruder conditions as in Example 1, a black extrusion composition was made by feeding carbon black master batch (Ampacet® Black Slip MB 49974 (60 wt % homopolymer polypropylene resin)) to the feed-throat.
EPDM and clay blend: 42.4 kg/hr
Powder mixture: 1.2 kg/hr
Carbon black master batch (40 wt % carbon black in PP): 4.8 kg/hr
PP to feed-throat: 5.4 kg/hr
PP pellet to feed zone: 3.5 kg/hr
2,5-dimethyl-2-5di(tert-butyl peroxy)hexane diluted with process oil: 1.3 kg/hr
Process oil between barrel #2 and #3: 2.7 kg/hr
Process oil between barrel #8 and #9: 7.4 kg/hr
Stabilizer slurry: 1.3 kg/hr

EXAMPLE #8

From the same raw materials, the same twin screw extruder, the same extruder conditions as in Example 7, the composition was made by side feeding a majority of polypropylene while maintaining total polypropylene level same.
PP to feed-throat: 2.9 kg/hr
PP pellet to cure zone: 6.0 kg/hr

| Barrel Temperature Profile (in ° C.) | | | | | | | | | | | | | | |
|---|---|---|---|---|---|---|---|---|---|---|---|---|---|---|
| Barrel | | | | | | | | | | | | | | |
| | #1 | #2 | #3 | #4 | #5 | #6 | #7 | #8 | #9 | #10 | #11 | #12 | #14 | #15 |
| Temperature | 60 | 130 | 130 | 130 | 120 | 120 | 120 | 120 | 120 | 130 | 130 | 130 | 145 | 160 |

EXAMPLE #9

From the same raw materials, the same twin screw extruder, the same extruder conditions as in Example 7, the composition was made by side feeding a majority of polypropylene while maintaining total polypropylene level same.

PP to feed-throat: 0 kg/hr (2.88 kg/hr added with carbon black masterbatch
(40% carbon black in polypropylene))
PP pellet to cure zone: 8.9 kg/hr

COMPARATIVE EXAMPLE #5

From the same raw materials, the same twin screw extruder, the same extruder conditions as in Example 7, side feeding polypropylene was fed to the ZSK-53 between barrel #9 and 10 in molten form by a single screw extruder after cure was substantially completed.

COMPARATIVE EXAMPLE #6

From the same raw materials, the same twin screw extruder, and the same extruder conditions as in Comparative example 4, a black extrusion composition was made by feeding a carbon black master batch additive to the feed-throat. The polypropylene was fed to the ZSK-83 (barrel #11) in a molten form by another twin screw extruder after cure was substantially completed.

EPDM and clay blend: 163.5 kg/hr
Powder mixture: 4.5 kg/hr
Carbon black master batch (40% carbon black in PP): 18.5 kg/hr
PP to feed-throat: 20.9 kg/hr
Molten PP after cure: 13.6 kg/hr
2,5-dimethyl-2-5di(tert-butyl peroxy)hexane diluted with process oil: 4.9 kg/hr
Process oil between barrel #2 and #3: 10.6 kg/hr
Process oil between barrel #8 and #9: 28.5 kg/hr
Stabilizer slurry: 4.9 kg/hr

TABLE 2

| | Examples (all feed units, phr) | | | |
|---|---|---|---|---|
| | Comp. Ex. #1 | Comp. Ex. #2 | Comp. Ex. #3 | Comp. Ex. #4 |
| Extruder | ZSK53 | ZSK53 | ZSK53 | ZSK83 |
| PP Split Ratio | 70/30 | 70/30 | 70/30 | 100/0 |
| Total PP level | 59.00 | 50.00 | 70.00 | 59.00 |
| PP to feed-throat | 41.00 | 35.00 | 49.00 | 59.00 |
| Solid PP pellets to Cure Zone | none | none | none | none |
| Molten PP after cure | 18.00 | 15.00 | 21.00 | 0.00 |
| Properties | | | | |
| Hardness (Iso 868, Shore A) | 71 | 66.7 | 73 | 64 |
| UTS (psi/MPa) (ASTM D 412) | 756/5.2 | 708/4.9 | 884/6.1 | 697/4.8 |
| UE (%) (ASTM D 412) | 419 | 396 | 533 | 395 |
| M100 (psi/MPa) | 389/2.7 | 338/2.3 | 405/2.8 | 347/2.4 |
| Weight Gain (%) | 105 | 116 | 114 | 111 |
| Tension Set (%) (ASTM D 412) | 13.5 | 10.5 | 15 | 11 |
| Compression Set at 100° C., 168 hr, 25% deflection (ASTM D395, Method B, Type1) (%) | 42 | 43 | 45 | — |

TABLE 1

| | Examples (all units, phr) | | | | | |
|---|---|---|---|---|---|---|
| | Ex. #1 | Ex. #2 | Ex. #3 | Ex. #4 | Ex. #5 | Ex. #6 |
| Extruder | ZSK53 | ZSK53 | ZSK53 | ZSK53 | ZSK53 | ZSK53 |
| PP Split Ratio | 70/30 | 70/30 | 70/30 | 53/47 | 36/64 | 18/82 |
| Total PP level | 59.00 | 50.00 | 70.00 | 59.00 | 59.00 | 59.00 |
| PP to feed-throat | 41.00 | 35.00 | 49.00 | 31.00 | 21.00 | 10.5 |
| Solid PP pellets to Cure Zone | 18.00 | 15.00 | 21.00 | 28.00 | 38.00 | 48.5 |
| Molten PP after cure | none | none | none | none | none | none |
| Properties | | | | | | |
| Hardness (Iso, Shore A) | 67 | 62.4 | 71.4 | 67.4 | 67.6 | 67.5 |
| UTS (psi/MPa) (ASTM D 412) | 817/5.6 | 688/4.7 | 900/6.2 | 911/6.3 | 895/6.2 | 894/6.2 |
| UE (%) (ASTM D 412) | 429 | 395 | 495 | 438 | 446 | 399 |
| M100 (psi/MPa) | 377/2.6 | 310/2.1 | 385/2.7 | 389/2.7 | 372/2.6 | 378/2.6 |
| Weight Gain (%) | 102 | 112 | 106 | 101 | 104 | 98 |
| Tension Set (%) (ASTM D 412) | 10 | 10 | 12.5 | 10 | 10 | 10 |
| Compression Set at 100° C., 168 hr, 25% deflection (ASTM D395, Method B, Type1) (%) | 38 | 32 | 41 | 38 | 35 | 34 |

Black grade examples are presented in Table 3 below.

TABLE 3

| | Examples (all feed units in phr) | | | | |
|---|---|---|---|---|---|
| | Ex. #7 | Ex. #8 | Ex. #9 | Comp. ex. #5 | Comp. ex. #6 |
| Extruder | ZSK53 | ZSK53 | ZSK53 | ZSK53 | ZSK83 |
| PP Split Ratio (feed throat/side feeder) | 61/39 | 33/69 | 0/100 | 61/39 | 61/39 |
| Total PP level (phr) | 46 | 46 | 46 | 46 | 46 |
| PP to feed-throat | 28 | 15 | 0 | 28 | 28 |
| Carbon Black MB (60 wt. % PP) | 24.2 | 24.2 | 24.2 | 24.2 | 24.2 |
| Solid PP pellets to Cure Zone | 18.0 | 30.6 | 45.6 | none | none |
| Molten PP after cure | none | none | none | 18.0 | 18.0 |
| Properties | | | | | |
| Hardness (ISO 868, Shore A) | 67.3 | 69.2 | 65.1 | 66.6 | 68.6 |
| UTS (psi/MPa) (ASTM D 412) | 812/5.6 | 863/6.0 | 913/6.3 | 786/5.4 | 810/5.6 |
| UE (%)) (ASTM D 412) | 387 | 335 | 362 | 450 | 403 |
| M100 (psi/MPa)) (ASTM D 412) | 362/2.5 | 411/2.8 | 376/2.6 | 450/3.1 | 387/2.7 |
| Weight Gain (%) | 109 | 93 | 104 | 130.5 | 112 |
| Tension Set (%) (ASTM D 412) | 10.5 | 10 | 10 | 11.5 | 11.5 |
| Melt Filtration Count (no.) | 4 | 2 | 2 | 24 | 23 |
| Surface Spot Count (no.) | 3 | 5 | 4+ | 100 | 200+ |
| Compression Set at 100° C., 168 h, 25% deflection (ASTM D395, Method B, Type1) (%) | 39 | 39 | 37 | 40 | 41 |

We claim:

1. A process for preparing a thermoplastic vulcanizate, the process comprising the steps of:
   i. preparing a blend that includes a vulcanizable rubber, a first thermoplastic resin, a second thermoplastic resin, and a curative for the vulcanizable rubber, where the first thermoplastic resin is in its molten state, and where at least a portion of the second thermoplastic resin is in its solid state;
   ii. maintaining the blend at a temperature above the melt temperature of the first thermoplastic resin and below the melt temperature of the second thermoplastic resin, thereby maintaining the first thermoplastic resin in its molten state while maintaining the second thermoplastic resin in its solid state;
   iii. after said step of maintaining the blend, initiating the vulcanization of the vulcanizable rubber while the vulcanizable rubber is undergoing mixing with the first thermoplastic resin while in its molten state and the second thermoplastic resin while in its solid state;
   iv. after said step of initiating the vulcanization, allowing the vulcanization of the vulcanizable rubber to continue while allowing the second thermoplastic resin to melt and thereby form a blend that includes the vulcanizable rubber, the first thermoplastic resin, and the second thermoplastic resin, where both the first thermoplastic resin and the second thermoplastic resin are in their molten state; and
   v. after said step of allowing vulcanization to continue, allowing the blend to cool.

2. The process of claim 1 wherein the curative for the vulcanizable rubber includes an organic peroxide compound.

3. The process of claim 2 wherein said vulcanizable rubber is selected from the group consisting of EPM, EPDM, butyl rubber, halogenated butyl rubber, polyisoprene rubber, polybutadiene rubber, and styrene-butadiene rubber.

4. The process of claim 3 wherein said vulcanizable rubber is EPDM.

5. The process of claim 4 wherein said solid particles D) is provided in amount equal to 5-95 wt. % of the total amount of A) plus D).

6. The process of claim 1, where the blend includes an oil.

7. The process of claim 6, further comprising the step of adding an oil to the blend that includes the vulcanizable rubber, the first thermoplastic resin in its molten state, and the second thermoplastic resin in its solid state.

8. The process of claim 7, further comprising the step of adding an oil to the blend that includes the vulcanized rubber, the first thermoplastic resin in its molten state, and the second thermoplastic resin in its molten state.

9. The process of claim 1, where said steps take place within a melt-processing extruder having two or more melt-kneading screws.

10. The process of claim 1, where the second thermoplastic resin, while in its solid state, is contained within particles having an effective diameter of not less than 0.05 mm.

11. The process of claim 10, where said particles are present during said step of initiating the vulcanization of the vulcanizable rubber.

12. A process for the preparation of dynamically vulcanized thermoplastic elastomers comprising:
   melt processing under high shear conditions:
   A) a lower melting propylene-based homopolymer or copolymer having a melt temperature ($T_m$) by DSC from about 80° C to 135° C and 180° C. and melt flow rate (MFR) by ASTM-D1238 (at 230° C. and 2.16 kg) of less than 1.2 dg/min;
   B) an EPDM rubber;
   C) at least one organic peroxide curing agent, and
   D) solid particles of a higher melting propylene-based homopolymer or copolymer that is the same or different as A) having a melt temperature ($T_m$) by DSC from about 135° C to 180° C, where said lower melting propylene-based homopolymer or copolymer has a melt temperature ($T_m$) that is at least 10° C. lower than the higher melting propylene-based homopolymer or copolymer;

wherein said solid particles D) are added during said melt processing prior to substantial completion of the vulcanization of B) so that said solid particles are present during vulcanization.

13. The method of claim 12, where the lower melting propylene-based homopolymer or copolymer, the higher melting propylene-based homopolymer or copolymer, and the EPDM rubber are melt processed at a temperature below the $T_m$ of the higher melting propylene-based homopolymer or copolymer.

14. The method of claim 13, where the lower melting propylene-based homopolymer or copolymer, the higher melting propylene-based homopolymer or copolymer, and the EPDM rubber form a molten mass including solid particles of the higher melting propylene-based homopolymer or copolymer, and where the temperature of the molten mass is increased above the $T_m$ of the higher melting propylene-based homopolymer or copolymer prior to introduction of the at least one organic peroxide curing agent.

15. A process for forming a thermoplastic vulcanizate, the process comprising the steps of:
  (i) forming a molten mass by melt processing a first thermoplastic resin and a vulcanizable rubber, where the molten mass includes solid particles of a second thermoplastic resin;
  (ii) dynamically vulcanizing the vulcanizable rubber while the first thermoplastic resin is in its molten state and at least a portion of the second thermoplastic resin is in the form of solid particles.

16. The process of claim 15, where the second thermoplastic resin is added to the molten mass after onset of said step of dynamically vulcanizing the rubber.

17. The process of claim 16, where the second thermoplastic resin is added in the form of particles having a mean particle size diameter of about 1 to about 7 mm and a mass temperature of less than or equal to about 100° C.

18. The process of claim 17, where the second thermoplastic resin is added to the molten mass prior to completion of said step of dynamically vulcanizing the rubber 19. The process of claim 15, where the process takes place in an extruder, and where the first thermoplastic resin, the rubber, and the second thermoplastic resin are introduced to the extruder together, where the $T_m$ of the first thermoplastic resin is at least about 10° C. lower than the $T_m$ of the second thermoplastic resin, and where said step of forming a molten mass includes maintaining the temperature of the molten mass at a temperature above the $T_m$ of the first thermoplastic resin but below the temperature of the second thermoplastic resin until at least said step of dynamically vulcanizing the rubber.

20. The process of claim 18, where the temperature of the molten mass is increased above the $T_m$ of the second thermoplastic resin during said step of dynamically vulcanizing the rubber.

* * * * *

UNITED STATES PATENT AND TRADEMARK OFFICE
CERTIFICATE OF CORRECTION

PATENT NO. : 7,622,528 B2  Page 1 of 1
APPLICATION NO. : 11/167480
DATED : November 24, 2009
INVENTOR(S) : Chung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this

Twenty-sixth Day of October, 2010

David J. Kappos
*Director of the United States Patent and Trademark Office*